(12) United States Patent
Rousseau (10) Patent No.: US 6,581,576 B1
(45) Date of Patent: Jun. 24, 2003

(54) OXIDIZER-REFERENCED FUEL SUPPLY SYSTEM

(76) Inventor: Tony Paul Rousseau, 2810 E. Eaton La., Cudahy, WI (US) 53110

( * ) Notice: Subject to any disclaimer, the term of this patent is extended or adjusted under 35 U.S.C. 154(b) by 0 days.

(21) Appl. No.: 09/507,067

(22) Filed: Feb. 18, 2000

Related U.S. Application Data (60) Provisional application No. 60/120,501, filed on Feb. 18, 1999.

(51) Int. Cl.[7] .............................................. F02M 37/04
(52) U.S. Cl. ...................................... 123/514; 123/533
(58) Field of Search ........................... 123/533, 531, 123/459, 457, 514

(56) References Cited

U.S. PATENT DOCUMENTS

| | | | | |
|---|---|---|---|---|
| 4,167,169 A | * | 9/1979 | White ......................... | 123/458 |
| 4,543,935 A | * | 10/1985 | Tuckey ....................... | 123/463 |
| 4,646,706 A | * | 3/1987 | Emmenthal .................. | 123/585 |
| 4,794,902 A | * | 1/1989 | McKay ........................ | 123/459 |
| 4,798,190 A | * | 1/1989 | Vaznaian et al. ............ | 123/531 |
| 5,081,969 A | * | 1/1992 | Long, III ..................... | 123/274 |
| 5,720,263 A | * | 2/1998 | Frank et al. ................. | 123/514 |
| 5,967,099 A | * | 10/1999 | Patrick ........................ | 123/1 A |

OTHER PUBLICATIONS

Summit Racing Catalog—Spring 1999—p. 5.

* cited by examiner

*Primary Examiner*—Carl S. Miller
(74) *Attorney, Agent, or Firm*—Michael Best & Friedrich, LLP (57) ABSTRACT

A fuel supply system includes a source of oxidizer providing oxidizer at an oxidizer pressure, a source of fuel providing fuel at a fuel pressure, and a fuel pressure regulator referenced to the oxidizer pressure. The fuel pressure regulator receives the fuel from the source of fuel at the fuel pressure, and discharges the fuel at an outlet pressure that is lower than the fuel pressure and proportional to the oxidizer pressure.

14 Claims, 10 Drawing Sheets

OXIDIZER-REFERENCED FUEL SUPPLY SYSTEM

This application claims the benefit of U.S. provisional application Ser. No. 60/120,501, filed Feb. 18, 1999.

FIELD OF THE INVENTION

The invention relates to fuel supply systems. More specifically, the invention relates to fuel supply systems including pressurized oxidizer.

BACKGROUND

In internal combustion engines fuel is mixed with air and the mixture is burned in a combustion chamber to drive the engine. It is known in the art that engine output can be enhanced by decreasing the fuel-to-oxygen ratio. In automotive applications, this is often accomplished by adding pressurized oxidizer to the fuel prior to combustion.

Prior art fuel supply systems of this type include a fuel pump that pumps fuel from a fuel tank or reservoir to a mixing chamber (e.g., intake manifold), and a depletable containment vessel containing pressurized oxidizer (typically a pressurized oxygen gas mixture) that expels oxidizer into the mixing chamber. Fuel is delivered to the mixing chamber at a rate determined by a fuel pressure regulator that is not referenced to the oxidizer pressure and that is in communication between the fuel pump and mixing chamber.

One problem with such prior art fuel supply systems is the variable nature of the pressurized oxidizer. Pressure in the containment vessel may vary with ambient temperatures surrounding the vessel, and with the volume of oxidizer contained therein. As a general rule, a decrease in ambient temperature or volume of oxidizer in the containment vessel will result in decreased oxidizer pressure, and an increase in ambient temperature will result in an increase in oxidizer pressure. Because fuel is provided at a substantially constant pressure and rate, changes in the amount of oxidizer provided alters the fuel-to-oxidizer ratio. As a result, the engine may stumble and stall if the fuel-to-oxidizer ratio becomes too high, or the fuel may burn too fast and damage the engine if the fuel-to-oxidizer ratio becomes too low.

Some prior art fuel supply systems utilize a bottle heater to maintain a desired temperature in the containment vessel, and thereby negate the effect of ambient temperature fluctuations. These systems do not address the problem of oxidizer depletion within the containment vessel, however. Additionally, bottle heaters can cause problems relating to overheating the oxidizer which can lead to engine damage or rupture of the containment vessel.

SUMMARY

The present invention provides a fuel supply system including a source of oxidizer, a source of fuel, and a fuel pressure regulator that is referenced to the oxidizer pressure. Preferably, the source of oxidizer is a containment vessel containing a pressurized oxidizer such as oxygen, nitrous oxide, or propylene oxide. Preferably, the source of fuel is a fuel pump for pumping gasoline or another fuel.

The fuel pressure regulator includes a first surface area and a second surface area. The pressure in the source of oxidizer acts on the first surface area, which is provided by a first pressure member (e.g., a piston), and is transformed into a first force proportional to the first surface area. The first force then acts on a second pressure member, which is preferably a flexible pressure member (e.g., a diaphragm). The source of fuel pressurizes the fuel in a pressure chamber to which the second surface area, which is preferably provided by the second pressure member, is exposed. The fuel pressure is thus transformed into a second force proportional to the second surface area. When the second force exceeds the first force, the second pressure member moves (e.g., deflects or flexes), actuating a bypass valve to route excess fuel back to the fuel pump, thereby determining the maximum resultant fuel pressure. Alternatively, the fuel pressure regulator may be a returnless or non-bypass regulator that modifies the flow of fuel into the pressure chamber.

Alternatively, a joining member (e.g., a lever arm) may extend between the first and second pressure members. The first and second forces create first and second moment forces, respectively, on the joining member. When the second moment force exceeds the first moment force, the second pressure member moves, actuating the bypass valve and thereby determining the maximum resultant fuel pressure. A fulcrum is positioned at a point along the joining member. The position of the fulcrum may be adjusted to modify the required second moment force.

Other features and advantages of the invention will become apparent to those skilled in the art upon review of the following detailed description, claims, and drawings.

BRIEF DESCRIPTION OF THE DRAWINGS

FIG. 9 is a schematic illustration of another alternative fuel supply system embodying the present invention.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter. The use of letters to identify elements of a method or process is simply for identification and is not meant to indicate that the elements should be performed in a particular order.

DETAILED DESCRIPTION

Figure 1:
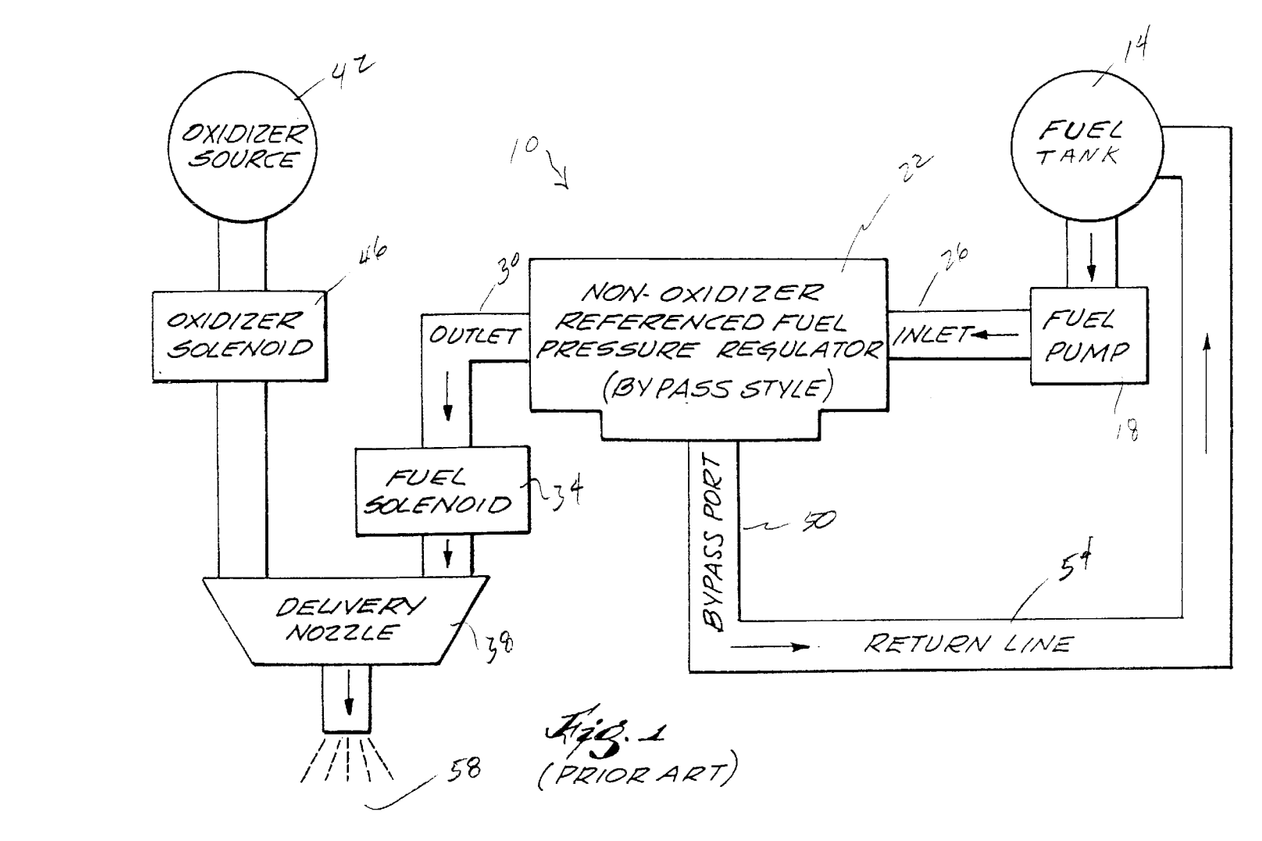
FIG. 1 is a schematic illustration of a prior art fuel supply system including a non-oxidizer-referenced bypass-style fuel pressure regulator.
Figure 2:
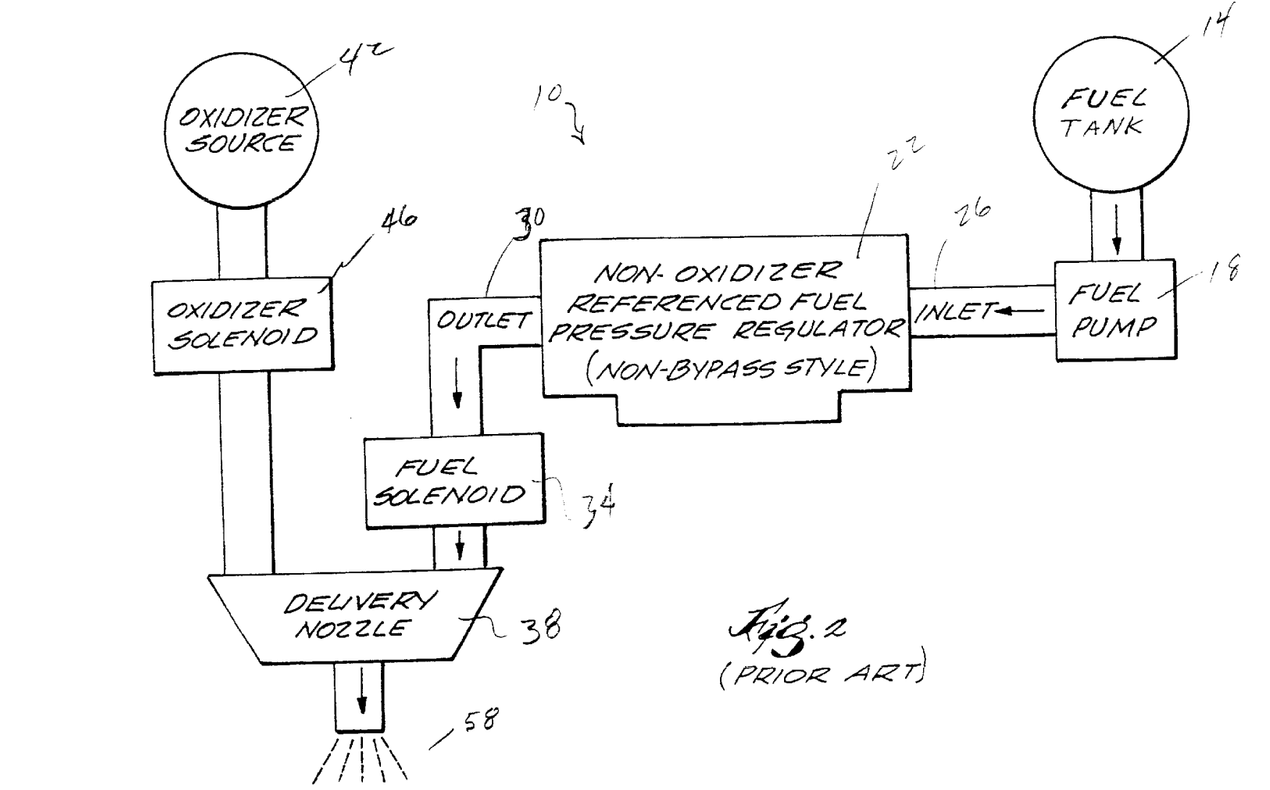
FIG. 2 is a schematic illustration of a prior art fuel supply system including a non-oxidizer-referenced non-bypass-style fuel pressure regulator.

FIGS. 1 and 2 illustrate a prior art system 10 including a fuel tank 14, a source of fuel or fuel pump 18, a pressure regulator 22 having inlet and outlet ports 26, 30, respectively, a first electronically activated solenoid valve or fuel solenoid 34, a delivery nozzle 38, a pressurized oxidizer containment vessel or oxidizer source 42, and a second electronically activated solenoid valve or oxidizer solenoid 46. The pressure regulator 22 of FIG. 1 is a bypass style pressure regulator, and therefore includes a bypass port 50 and return line 54 for returning excess fuel to the fuel tank 14.

In the prior art systems 10 illustrated in FIGS. 1 and 2, fuel is pumped into the inlet port 26 of the fuel pressure regulator 22. Fuel at the desired pressure is then expelled through the outlet port 30. After exiting the outlet port 30, the fuel flow is interrupted by the electronically-activated solenoid valve 34. Upon solenoid activation, fuel is permitted to flow to the delivery nozzle 38, where it is then expelled into a mixing chamber 58 for ignition. On the oxidizer side of the systems 10, the pressurized oxidizer containment vessel 42 is plumbed into the oxidizer solenoid 46. Upon activation of the oxidizer solenoid 46, oxidizer is permitted to flow to the delivery nozzle 38 where it is then expelled into the mixing chamber 58. Typically, the oxidizer and fuel solenoids 46, 34 are activated simultaneously. In all currently-known systems, oxidizer containment vessel 42 pressure has no bearing on the pressure at which the fuel is injected.

The system 10 illustrated in FIG. 1 depicts a bypass style regulator 22 to control pressure at the outlet port 30. The system 10 illustrated in FIG. 2 uses a returnless or non-bypass style regulator 22 to control pressure at the outlet port 30. The regulators 22 in the systems 10 could employ a valve, disk, ball check, or other such device to control the amount of fuel permitted to return to the fuel tank (bypass style, see FIG. 1), or to reach the outlet port 30 (non-bypass style, see FIG. 2), thereby regulating outlet port 30 pressure. The regulators 22 in FIGS. 1 and 2 are non-oxidizer referenced. In FIGS. 3–16, identical elements are identified with the same reference numerals used in FIGS. 1 and 2.

Figure 3:
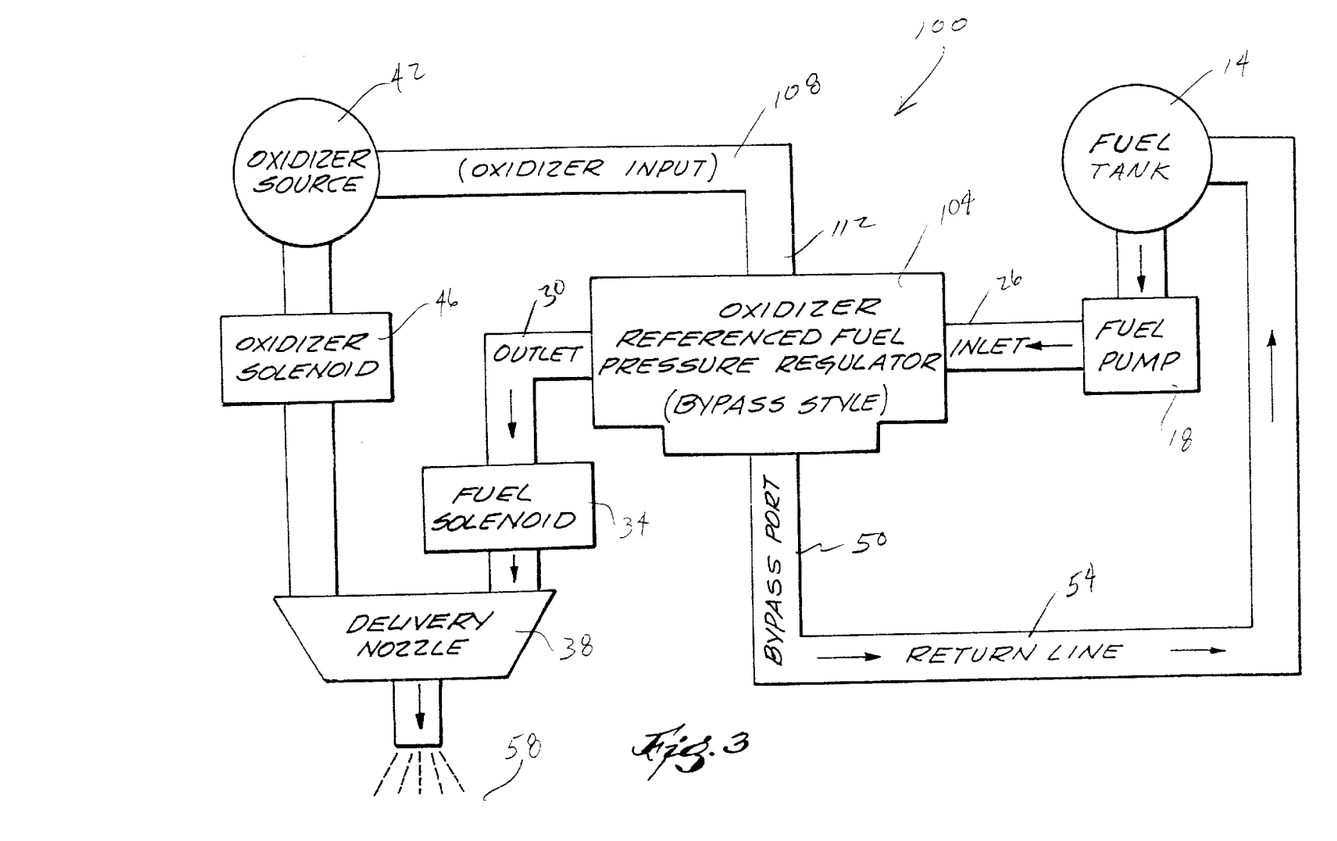
FIG. 3 is a schematic illustration of a fuel supply system embodying the present invention.
Figure 4:
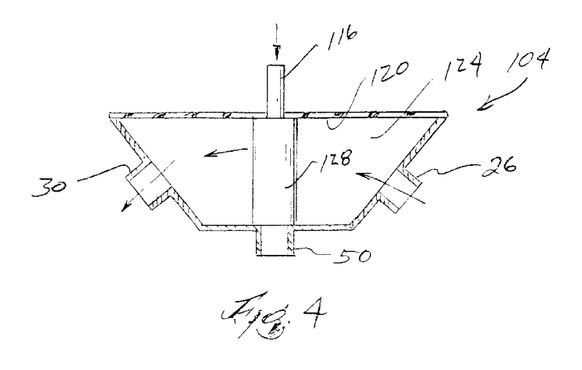
FIG. 4 is a schematic illustration of a fuel pressure regulator for use in the system illustrated in FIG. 3 and in a zero bypass state.

FIG. 3 illustrates a fuel supply system 100 including an oxidizer-referenced, bypass-style fuel pressure regulator 104. The fuel pressure regulator 104 communicates with the oxidizer source 42 by way of an oxidizer input tube 108 and an oxidizer port 112. In this system 100, as described below in more detail, the oxidizer source 42 pressure has a proportional relationship with the pressure at the outlet port 30 of the pressure regulator 104.

FIGS. 4–7 illustrate two example constructions of the pressure regulator 104. In each example, the pressure regulator 104 receives oxidizer through the oxidizer port 112 and receives fuel through the inlet port 26. The pressure regulator 104 in each example includes a first pressure member 116 defining a first surface area and a second pressure member 120 defining a second surface area. Any pressurized source of oxidizer and fuel, including a pressurized oxidizer containment vessel and fuel pump, will work in this system 100. The oxidizer in the containment vessel 42 may be, for example, oxygen, nitrous oxide, or propylene oxide. The fuel may be gasoline or any other suitable fuel.

Still referring to FIGS. 4–7, the illustrated first pressure member 116 is a piston, although other members having a surface area may be used. The first surface area is exposed to the pressure of the containment vessel 42 at the oxidizer port 112. The pressure in the containment vessel 42 acts on the first surface area and is transformed into a first force acting in a direction normal to the first surface area (i.e., along the length of the piston). The magnitude of the first force is proportional to the size or magnitude of the first surface area.

Figure 5:
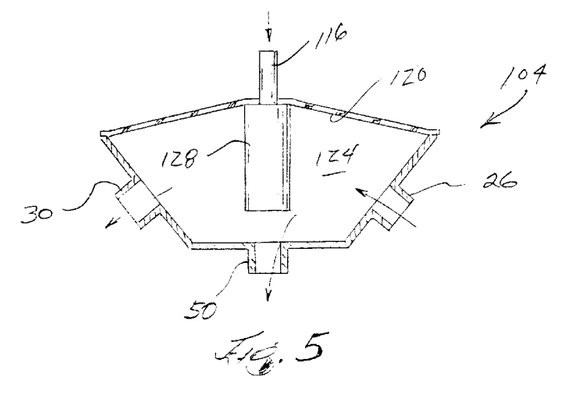
FIG. 5 is a schematic illustration of the fuel pressure regulator of FIG. 4 in a full bypass state.

The illustrated second pressure member 120 is a flexible member (e.g., a diaphragm), although other members having a surface area may be used. The second surface area is exposed to pressurized fuel supplied by the pump 18. The second surface area at least partially defines a pressure chamber 124. The fuel bypass valve 128 is interconnected with the second pressure member 120 and selectively restricts flow through the bypass port 50. The pressure chamber 124 communicates though the bypass port 50 with the fuel tank 14. Fuel is routed from the pressure chamber 124 to the fuel tank 14 when the bypass valve 128 is in an open position (FIGS. 5 and 7).

Pressurized fuel flows through the fuel inlet port 26, into the pressure chamber 124, and out the outlet port 30. The fuel pressure acts on the second surface area and is transformed into a second force acting in a direction normal to the second surface area. The magnitude of the second force is proportional to the size or magnitude of the second surface area.

The first force changes in proportion to changes in pressure within the oxidizer containment vessel 42. The fuel pump 18 continually pumps fuel into the pressure chamber 124 through the inlet port 26. The fuel pump 18 provides fuel to the pressure chamber 124 at a greater rate than the fuel exits through the outlet port 30, resulting in increased pressure in the pressure chamber 124.

When the second force exceeds the first force, the second pressure member 120 is moved (e.g., deflected or flexed, see FIGS. 5 and 7), thereby moving the bypass valve 128 away from the bypass port 50 to allow more fuel to flow back to the fuel tank 14 and limiting the fuel pressure at the outlet port 30 to a predetermined maximum, for a given oxidizer pressure. Because the fuel pump 18 provides fuel at a constant rate, the fuel pressure during operating conditions is generally held at the maximum. The maximum fuel pressure at the outlet port 30 is thus proportional to the pressure in the oxidizer containment vessel 42. In this regard, the fuel pressure is referenced to the oxidizer pressure, and proportional amounts of fuel and oxidizer are mixed regardless of the pressure in the containment vessel 42.

The fuel pressure for this embodiment is easily determined by the following equation:

$$FP=(OP \times SA1)/SA2$$

where FP is fuel pressure, OP is oxidizer pressure, SA1 is the first surface area, and SA2 is the second surface area.

Figure 6:
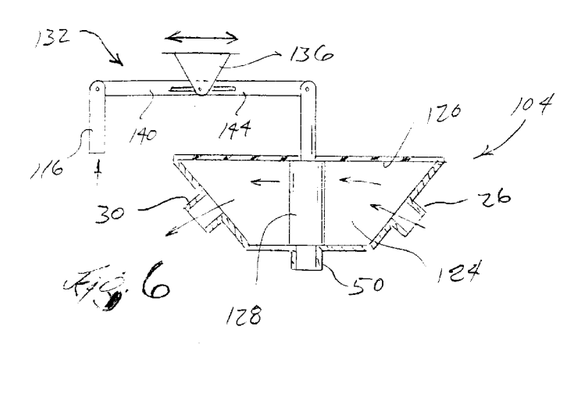
FIG. 6 is a schematic illustration of an alternative fuel pressure regulator for use in the system illustrated in FIG. 3 and in a zero bypass state.
Figure 7:
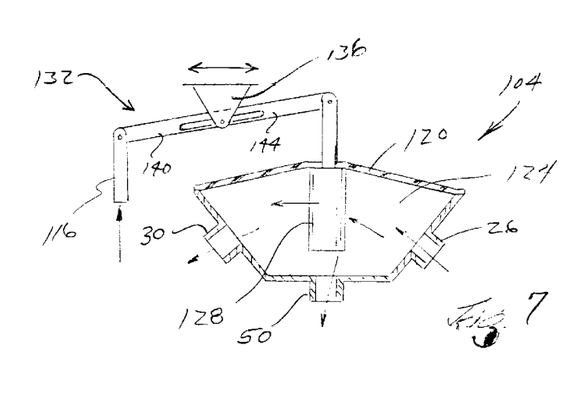
FIG. 7 is a schematic illustration of the fuel pressure regulator of FIG. 6 in a full bypass state.

FIGS. 6 and 7 illustrate an alternative construction of the fuel pressure regulator 104. In this construction, a joining member 132 (e.g., a lever arm) joins the first and second pressure members 116, 120. An adjustable fulcrum 136 is movable along the length of the joining member 132 to divide the joining member 132 into first and second lever arms 140, 144 extending from the fulcrum 136 to the first and second pressure members 116, 120, respectively.

The first and second forces act through the first and second lever arms 140, 144 respectively, to create first and second moment forces, respectively. Because the first and second moment forces are dependent on the position of the fulcrum 136, the magnitude of the second force required to overcome the first force depends on both the ratio of the first surface area to the second surface area, and on the position of the fulcrum 136. Therefore, in this embodiment, the first force-to-second force ratio required to deflect the second pressure member 120 may be partially controlled by the position of the fulcrum 136.

The fuel pressure for this embodiment is easily determined by the following equation:

$$FP=(OP \times SA1 \times LR)/SA2$$

where FP is fuel pressure, OP is oxidizer pressure, SA1 and SA2 are the magnitudes of the first and second surface areas, respectively, and LR is the lever ratio (the length of the first lever arm 140 divided by that of the second lever arm 144).

This alternative construction allows easy adjustment of the fuel pressure in the system 100 by adjustment of the position of the fulcrum 136. Take for example a situation in which 80 lbs. of fuel pressure is desired for a particular application, the first surface area is 0.1 square inch, and the second surface area is 1 square inch. If the oxidizer pressure starts at 800 psi, the first force will be 80 lbs. (800 psi×0.1 inch). Therefore, the lever ratio (ratio of the first lever arm 140 length to the second lever arm 144 length) may be set at 1, with the fulcrum 136 centered between the first and second pressure members 116, 120.

If, however, the pressure in the containment vessel 42 changes, the first force will change, and the fuel pressure will also change. The fuel pressure may be maintained at 80 lbs. by adjusting the fulcrum 136 position, and thus adjusting the lever ratio. For example, assume the oxidizer pressure drops to 400 psi due to decreased temperature or decreased volume of oxidizer. In this situation, the first force will be 40 lbs. (400 psi×0.1 inch). The fuel pressure may be maintained at 80 lbs. by adjusting the lever ratio to 2 (position the fulcrum ⅔ of the distance from the second pressure member 120 to the first pressure member 116).

Figure 8:
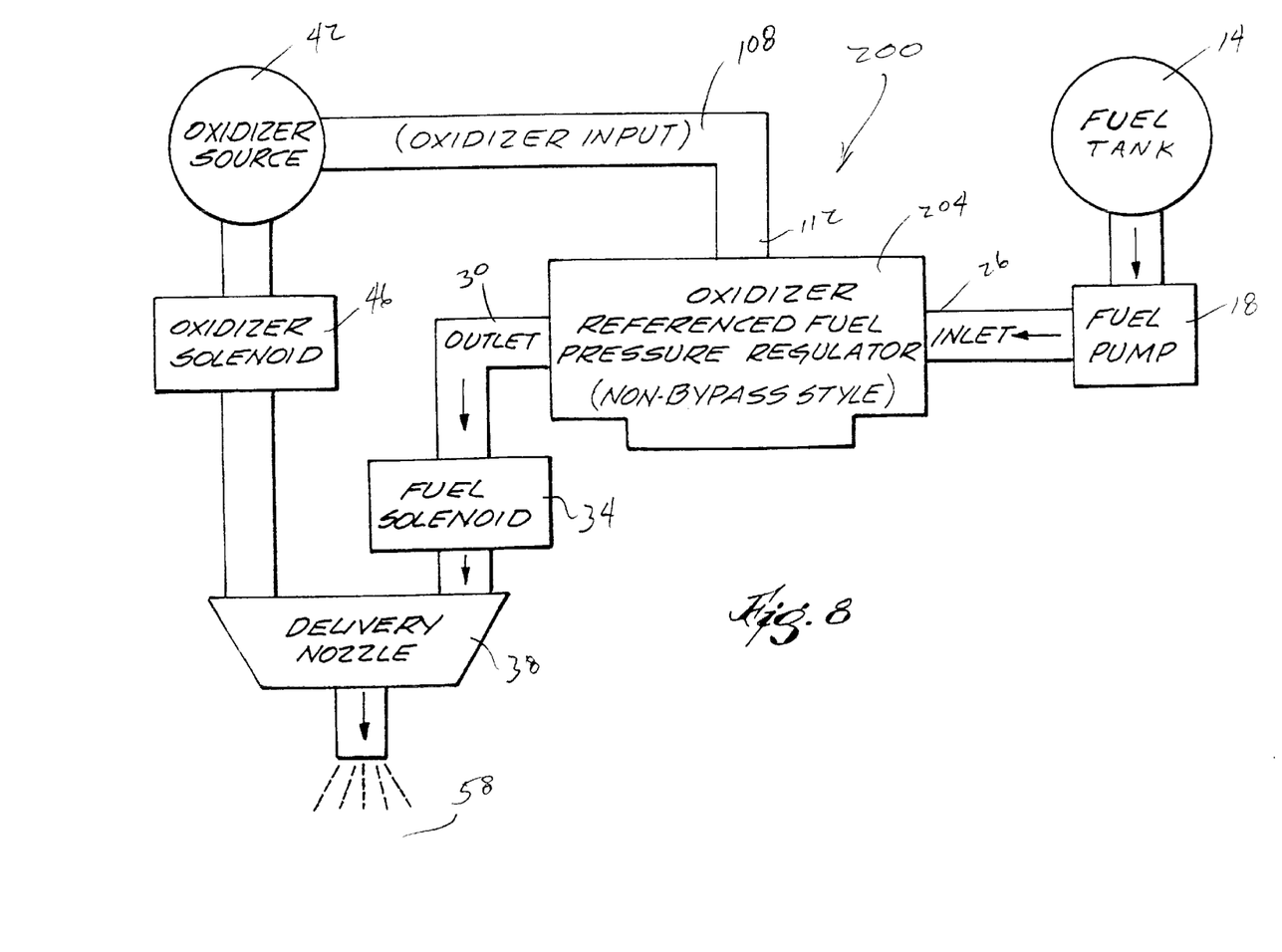
FIG. 8 is a schematic illustration of an alternative fuel supply system embodying the present invention.

FIG. 8 depicts another fuel supply system 200 utilizing an oxidizer-referenced, non-bypass fuel pressure regulator 204. In this system 200 oxidizer containment vessel 42 pressure also has a proportional relationship with the pressure at the outlet port 30. The only difference between this system 200 and the system 100 illustrated in FIG. 3 is that the fuel pressure regulator 204 is a non-bypass style regulator.

FIG. 9 depicts a fuel supply system 300 utilizing a bypass-style oxidizer-referenced fuel pressure regulator 304. In this system 300, the pressure regulator 304 is electronically referenced to the oxidizer containment vessel 42. A pressure transducer 308 electronically relays containment vessel 42 pressure to an electronic control module 312. The module 312 alters the voltage and/or current supplied to an electromagnetic force motor 316 to alter the amount of force placed on the fuel diaphragm within the pressure regulator 304, thereby altering the fuel pressure at the outlet port 30. With this arrangement, the relationship of fuel pressure and containment vessel 42 pressure would not have to be linear. This would allow fine tuning of the pressure ratio to maintain an ideal fuel-to-oxidizer ratio.

Figure 10:
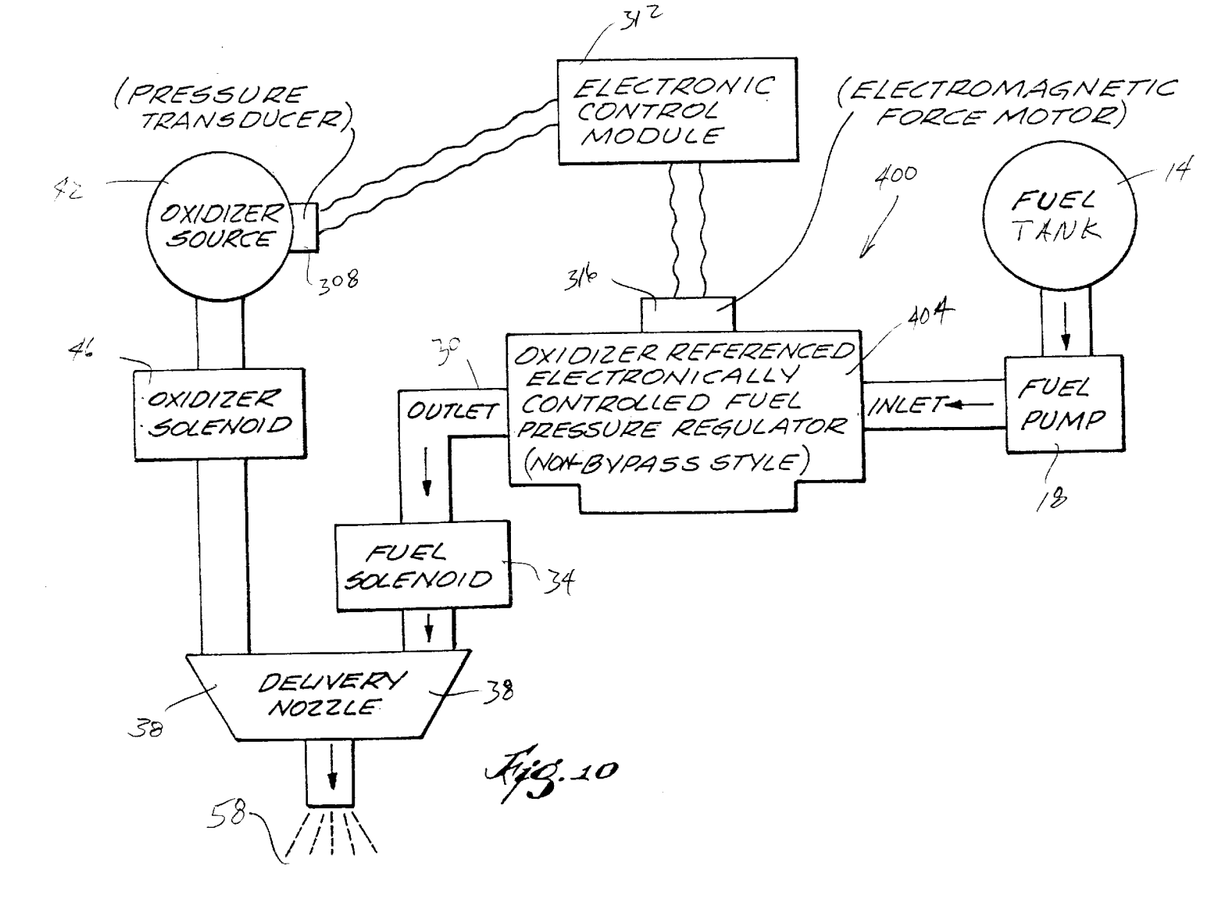
FIG. 10 is a schematic illustration of another alternative fuel supply system embodying the present invention.

FIG. 10 depicts a fuel supply system 400 using the same electronic control systems as depicted in FIG. 9. This system 400, however, uses a non-bypass style regulator 404.

Figure 11:
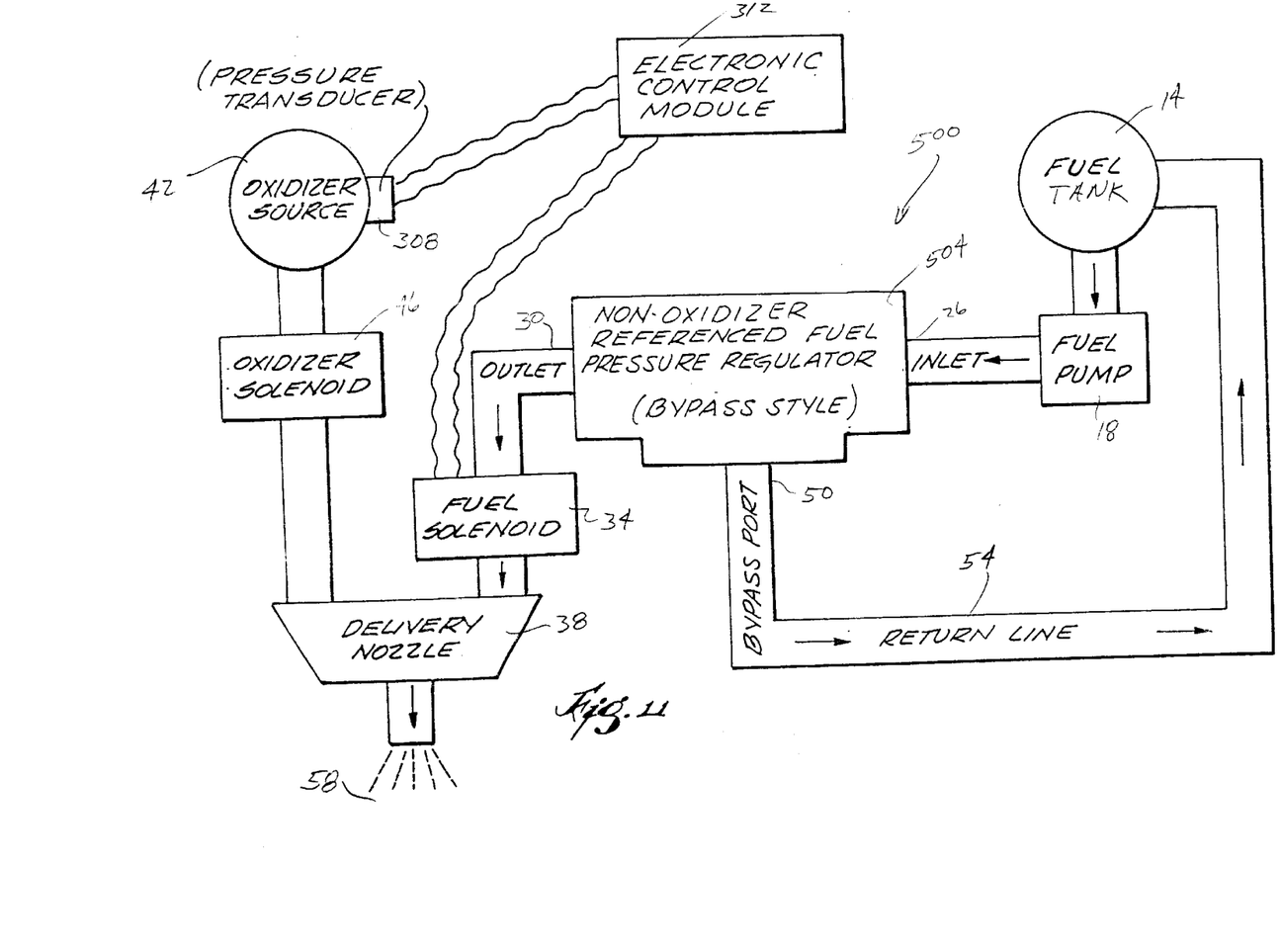
FIG. 11 is a schematic illustration of another alternative fuel supply system embodying the present invention.

FIG. 11 depicts a fuel supply system 500 utilizing a bypass-style fuel pressure regulator 504 that is not directly referenced to the oxidizer source 42 pressure. As in FIG. 9, the pressure transducer 308 relays oxidizer containment vessel pressure to the electronic control module 312, the module 312 then alters the pressure to the delivery nozzle 38 by pulsing the fuel solenoid valve 34 appropriately. This is done by either altering the pulse frequency, or the pulse width.

Figure 12:
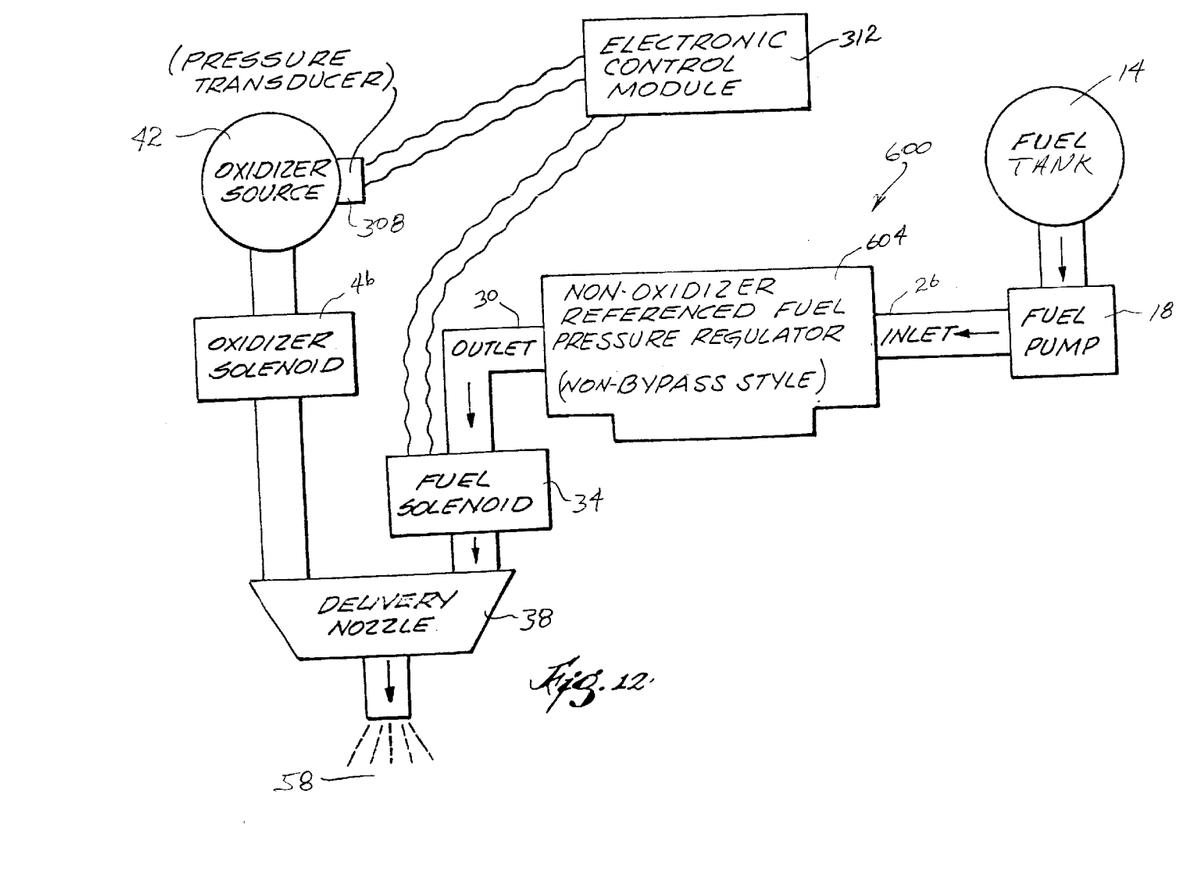
FIG. 12 is a schematic illustration of another alternative fuel supply system embodying the present invention.

FIG. 12 depicts a fuel supply system 600 utilizing a non-oxidizer referenced, non-bypass style fuel pressure regulator 604 to establish the desired pressure at the outlet port 30. As in FIG. 11, the control module 312 controls the fuel solenoid 34.

The electronically-controlled fuel regulation systems 300, 400, 500, and 600 do not have to maintain a linear relationship between the oxidizer containment vessel 42 pressure and the quantity of fuel being injected into the mixing chamber 58. All of the illustrated regulators 104, 204, 304, 404, 504, and 604 may be modified to compensate for pressure changes within the mixing chamber 58 by referencing the surface of the second pressure member 120 opposite the second pressure surface to the pressure in the mixing chamber 58. In the electronic systems 500, 600, this could be accomplished by either referencing the non-oxidizer referenced fuel pressure regulator 504, 604 to the pressure on the mixing chamber 58, or by installing a pressure transducer into the mixing chamber 58, allowing the electronic control module 312 to compensate for changes in mixing chamber pressure 58. Mixing chamber pressure can be either negative or positive in relation to atmospheric pressure.

Electronic fuel injection systems 500, 600 can also be referenced to oxidizer containment vessel 42 pressure. Certain electronic fuel injections systems are capable of supplying supplemental fuel when they are used in conjunction with an oxidizer injection system. They accomplish this by either increasing the fuel injector's pulse width or adding an asynchronous pulse whenever the oxidizer solenoid valve 34 is activated. These systems can be easily referenced to the oxidizer containment vessel 42 pressure by using a pressure transducer to relay containment vessel 42 pressure to the fuel injection system's electronic control module 312. This module 312 could then alter the fuel injector's duty cycle to appropriately compensate for changes in containment vessel 42 pressure.

Figure 13:
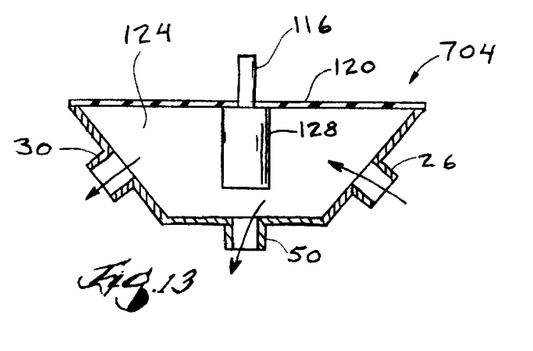
FIG. 13 is a schematic illustration of an alternative fuel pressure regulator for use in a bypass fuel supply system according to the present invention.
Figure 14:
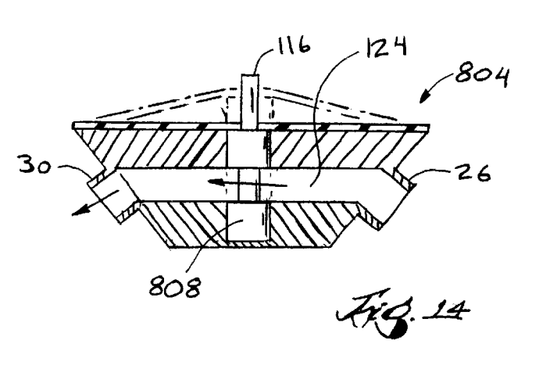
FIG. 14 is a schematic illustration of another alternative fuel pressure regulator for use in a non-bypass fuel supply system according to the present invention.
Figure 15:
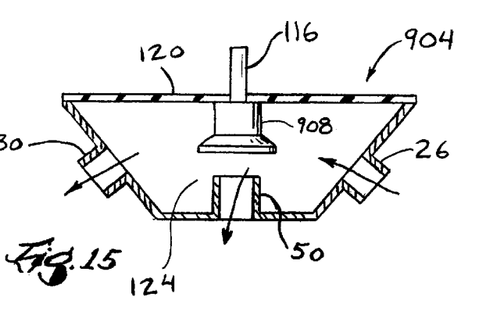
FIG. 15 is a schematic illustration of another alternative fuel pressure regulator for use in a bypass fuel supply system according to the present invention.
Figure 16:
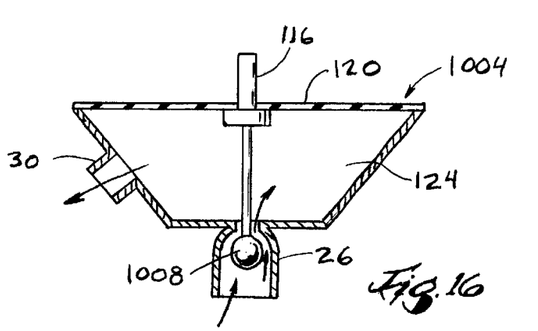
FIG. 16 is a schematic illustration of another alternative fuel pressure regulator for use in a non-bypass fuel supply system according to the present invention.

FIGS. 13–16 illustrate alternative oxidizer-referenced fuel pressure regulator constructions. The pressure regulator 704 illustrated in FIG. 13 is substantially the same as the regulator shown in FIGS. 4 and 5 except the bypass valve 128 is unseated in the regulator's at-rest position. The pressure regulator 804 illustrated in FIG. 14 is a non-bypass style regulator that includes a spool-shaped piston 808. Fuel pressure acting on the piston 808 causes the diaphragm to deflect and the piston 808 to move up, as shown in phantom, which restricts the amount of fuel passing through the regulator 804. FIG. 15 illustrates a bypass style regulator 904 including a disc-shaped bypass valve 908 that may seat or unseat on the bypass port 50. FIG. 16 illustrates a ball-type valve 1008 used in a non-bypass type pressure regulator 1004.

Although particular embodiments of the present invention have been shown and described, other alternative embodiments will be apparent to those skilled in the art and are within the intended scope of the present invention. Thus, the present invention is to be limited only by the following claims.

What is claimed is:

1. A fuel supply system comprising:
   a source of oxidizer providing oxidizer at an oxidizer pressure of at least 400 psi;
   a source of fuel providing fuel at a fuel pressure; and a fuel pressure regulator having an inlet port and an outlet port, said fuel pressure regulator receiving the fuel from said source of fuel through said inlet port at said fuel pressure, and said fuel pressure regulator being referenced to said oxidizer pressure to discharge the fuel through said outlet port at an outlet pressure that is lower than said fuel pressure and proportional to said oxidizer pressure.

2. The fuel supply system of claim 1, wherein said fuel pressure regulator is a bypass-style fuel regulator having a bypass port, and wherein said fuel pressure regulator selectively discharges fuel through said bypass port to achieve said outlet pressure at said outlet port.

3. The fuel supply system of claim 1, wherein said fuel pressure regulator includes a first pressure member having a first surface area exposed to said oxidizer pressure to create a first force, and a second pressure member having a second surface area exposed to said fuel pressure to create a second force, said first and second pressure members being interconnected with each other such that said first and second forces at least partially oppose one another, whereby said fuel pressure is reduced to said outlet pressure when said second force exceeds said first force.

4. The fuel supply system of claim 3, wherein said pressure regulator includes a bypass port, and wherein said bypass port is opened in response to said second force exceeding said first force.

5. The fuel supply system of claim 3, wherein said first pressure member is a piston.

6. The fuel supply system of claim 3, wherein said second pressure member is a flexible diaphragm.

7. The fuel pressure regulator of claim 4, further comprising a bypass valve interconnected with said second pressure member and movable away from said bypass port to increase the flow of fuel through the bypass port and movable toward said bypass port to decrease the flow of fuel through the bypass port, wherein movement of said second pressure member selectively moves said bypass valve away from and toward said bypass port.

8. A fuel pressure regulator for use with a source of fuel, an engine, and a source of oxidizer providing oxidizer at an oxidizer pressure, the regulator comprising:
   an inlet port adapted to communicate with the source of fuel to receive fuel therefrom;
   an outlet port adapted to communicate with the engine to provide fuel thereto; and
   at least one pressure responsive member having a first surface area exposed to the oxidizer and a second surface area greater than the first surface area and exposed to the fuel within the regulator, and operable to adjust the pressure of fuel flowing out of said outlet port to be less than and proportional to the oxidizer pressure.

9. The regulator of claim 8, wherein said pressure responsive member includes a first pressure member having said first surface area and a second pressure member having said second surface area, said first surface area being exposed to the oxidizer pressure and said second surface area being exposed to the fuel pressure within the regulator.

10. The regulator of claim 8, further comprising a deflectable member deflecting in response to the pressure differential between the oxidizer pressure and the pressure of fuel within the regulator, said deflectable member selectively restricting the flow of fuel out of said regulator to thereby regulate the pressure of the fuel flowing out of the regulator.

11. The regulator of claim 10, further comprising a bypass port, wherein said deflectable member selective restricts the flow of fuel out of said regulator through said bypass port to thereby selectively restrict the flow of fuel out of said outlet port.

12. The regulator of claim 8, wherein said pressure responsive member includes at least one flexible diaphragm.

13. The regulator of claim 8, wherein said pressure responsive member includes at least one piston.

14. The fuel supply system of claim 1, wherein the outlet pressure is lower than said oxidizer pressure.

* * * * *